United States Patent [19]
Margen

[11] 3,879,265
[45] Apr. 22, 1975

[54] APPARATUS FOR EVAPORATING LIQUIDS

[75] Inventor: Peter Heinrich Erwin Margen, Nykoping, Sweden

[73] Assignee: Aktiebolaget Atomenergi, Stockholm, Sweden

[22] Filed: Aug. 14, 1973

[21] Appl. No.: 388,269

[30] Foreign Application Priority Data
Aug. 28, 1972 Sweden.............................. 11131/72

[52] U.S. Cl................ 202/173; 159/2 MS; 159/15; 203/11
[51] Int. Cl......... B01d 1/22; B01d 3/00; B01d 3/02
[58] Field of Search............ 159/2 MS, 15; 202/173; 203/11

[56] References Cited
UNITED STATES PATENTS

| | | | |
|---|---|---|---|
| 3,203,464 | 8/1965 | Kingma | 159/2 MS |
| 3,427,227 | 2/1969 | Chamberlin | 202/173 X |
| 3,515,645 | 6/1970 | Welch | 202/173 |

FOREIGN PATENTS OR APPLICATIONS

| | | | |
|---|---|---|---|
| 1,288 | 1905 | United Kingdom | 159/18 |
| 1,240,103 | 7/1971 | United Kingdom | 203/11 X |

*Primary Examiner*—Jack Sofer
*Attorney, Agent, or Firm*—Toren, McGeady and Stanger

[57] ABSTRACT

There is provided an apparatus for evaporating salt water, especially for use in the low pressure chambers of a desalination plant, said apparatus comprising curved vanes, which are arranged one after the other and being curved in opposite directions so that a film of saltwater flowing along the concave sides of the vanes is subjected to oppositely directed centrifugal force fields on neighbouring guide vanes and exposure on opposite surfaces.

9 Claims, 3 Drawing Figures

3,879,265

APPARATUS FOR EVAPORATING LIQUIDS

The present invention relates to an apparatus for evaporating liquids, particularly for evaporating salt water under low pressure in a desalination plant, comprising a liquid emitter, a guide surface along which the liquid flows, and a means for collecting the liquid.

In conventional desalination plants the evaporation is arranged by conducting heated water through a series of evaporation chambers in which evaporation occurs due to natural steam separation at the exposed surface of the water. The pressure in the series of evaporation chambers may vary from for example 2 atm in the first chamber to for example 0.03 atm in the last chamber. Thus in the final stage of the series a low pressure prevails and this means that the evaporation chambers in this stage must be large. Furthermore, the low pressure causes the steam produced to flow at high speed and it may therefore easily take with it drops of salt water so that the condensate is easily contaminated.

It would be reasonable to replace these last chambers by evaporation apparatus in the form of cyclone separators in which the water is set in rotation to separate the steam. Admittedly this decreases the impurities and the size of the construction, but the difference in temperature between the water and steam leaving is too great and also the water must be forced, for example by means of pumps, because of the friction losses.

The invention aims at providing a favourable temperature relation between the water and steam leaving while maintaining the advantages of the known technique. This object is achieved by means of an apparatus which is characterized in that the guide surface consists of at least two guide vanes, each having substantially only one curve, arranged one after the other, the generatrices having substantially the same direction, adjacent guide vanes being oppositely curved, and that the liquid emitter is arranged to conduct the liquid towards the concave side of the first guide vane and that the means for collecting liquid is arranged to conduct the water from the concave surface of the last guide vane to the means for collecting liquid, so that a film of liquid flowing along the guide vanes is subjected to essentially oppositely directed centrifugal force fields on neighbouring guide vanes and exposure on opposite surfaces to produce steam and separate said steam.

Adjacent guide vanes may be arranged to overlap each other along a straight zone where the film is made to flow straight so that steam can be freely developed in the film but cannot leave this before the film arrives at the curved surface of the following guide vane. The liquid emitter may consist of a first vessel provided at its lower part with a spout which directs the water towards the first guide vane. This means for collecting liquid may consist of a second vessel, at the upper part of which a guide is arranged to direct the water film towards the liquid surface of the second vessel. The guide may have substantially the same shape as the guide vanes.

The first vessel and the spout may be designed so that most of the steam separated at the first guide vane is formed in the spout. This is achieved if the pressure difference between adjacent chambers is substantially greater than the pressure difference caused by the different levels of their vessels. Thus, the difference between said pressure differences (minus any pressure loss due to flow resistance) results in the formation of steam. This means that the outlet of the spout should not lie much lower than the water level of the vessel since otherwise the pressure difference caused by the difference in level will be too high, resulting in the water being "undercooled."

The steam produced in the spout also helps to accelerate the water, thus increasing the efficiency of the steam separating process.

Since the steam is thus produced evenly distributed in the water film, in the spout and in the straight zone between the guide vanes, a more uniform temperature profile is obtained over the film than if the steam were to be produced mainly along the free surfaces of the film.

In one embodiment of the invention the guide vanes may be arranged so that their generatrices lie substantially horizontal. The spout is then directed obliquely upwards and towards the concave surface of the first guide vane. The guide is then suitably curved so that its concave surface faces the liquid surface in the second vessel. The last guide vane is then curved oppositely to the guide.

The guide vanes, spout, guide and the second vessel may be built in to a housing which also includes a condensor and members for collecting and removing condensation which is formed in the condensor from the steam.

The apparatus can be operated by gravity, in which case the two vessels should be arranged with suitable level difference.

The apparatus preferably constitutes a stage in a plant comprising substantially similar stages connected in series, in which case the second vessel also constitutes the liquid emitter for a subsequent stage.

The invention will be further described in the following with reference to the accompanying drawings.

Figure 1:
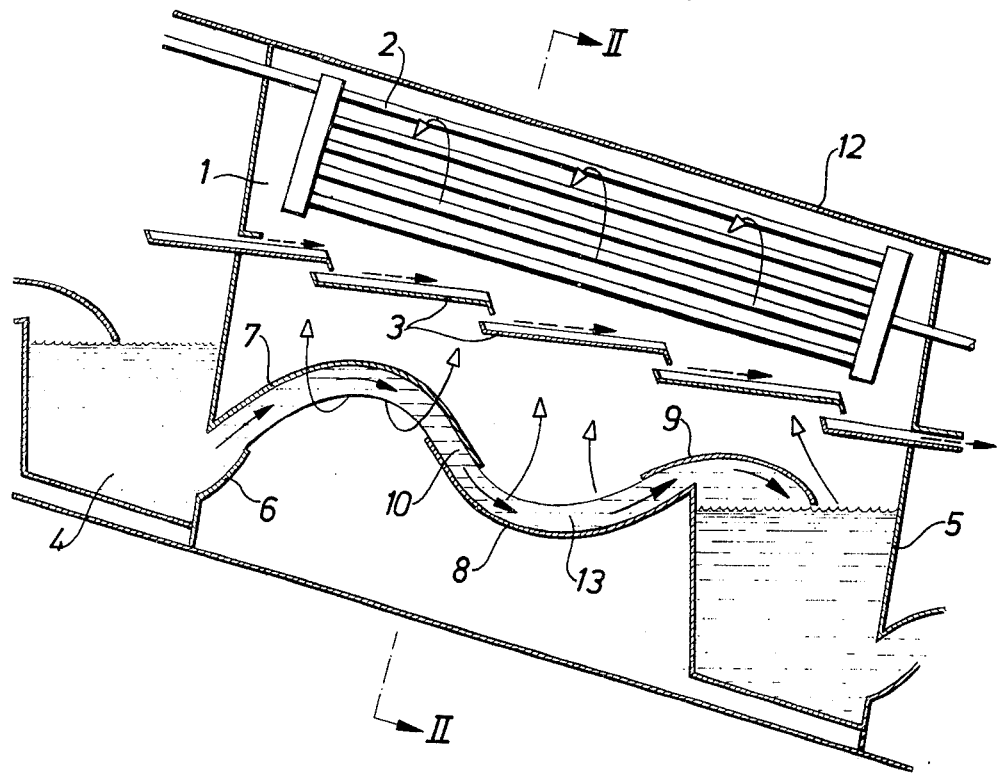
FIG. 1 shows a longitudinal section through the apparatus according to the invention and FIG. 2 shows a section taken along the line 2—2 in FIG. 1.

FIG. 1 shows one low pressure stage in a desalination plant, which is built into a housing 12. At the top of FIG. 1 is a preheater consisting of a steam chamber 1, a loop or group of pipes 2 and condensation trough 3. At the left in FIG. 1 is a first vessel 4 for the emission of salt water and at the right is a second vessel for collecting salt water. At the bottom of the vessel 4 is a spout 6 directed obliquely upwards, which directs a water film 13, indicated by unbroken, filled-in arrows, towards a first guide vane 7. The film 13 is then conducted to a second guide vane 8 from which it is guided by means of a guide 9, preferably having the same shape as the guides 7, 8, to the second vessel 5 by means of gravity. The guide vanes 7 and 8 have one curve each and are arranged so that their generatrices lie in the horizontal plane.

Salt water enters through the loop 2 and flows to the left in FIG. 1 through the preheater where it is heated. The salt water is then conducted to a heater, not shown, where extra heat is supplied which is necessary for the evaporation.

The water is then gradually conducted to the vessel 4, from which it is led by way of the spout 6, guide vanes 7 and 8 and guide 9 to the vessel 5.

The water film is directed towards the downwardly facing, concave surface of the first guide vane 7 and is led through a straight zone 10 in which the guide vanes overlap each other, to the upwardly facing, concave surface of the guide vane 8. The film is then conducted by way of the concave surface of the curved guide 9, the centre of curvature of which is below the guide, to the vessel 5.

The apparatus shown constitutes only one stage of several series-connected stages in a desalination plant and the vessel 5 therefore also constitutes the water emitter for an apparatus connected subsequently.

Boiling occurs in the apparatus due to the pressure decrease of the water. Evaporation will be greatest at the exposed surface of the film 13 where the pressure is least. Evaporation also takes place at the exposed surfaces of the liquid in the vessels 4 and 5.

The curvature of the guide vanes contributes to the water film 13 being subjected to a field or force so that steam but not drops of water can leave the film.

Thanks to the guide vanes being curved in opposite directions, the water film 13, which has substantially laminar flow, will be exposed on both sides which means that the temperature difference between the steam and the salt water leaving the apparatus will be as little as possible.

In the straight zone between the guide vanes the film is caused to flow straight so that steam can be freely developed in the film but cannot leave this until the film arrives at the curved surface of the subsequent guide vane.

Figure 2:
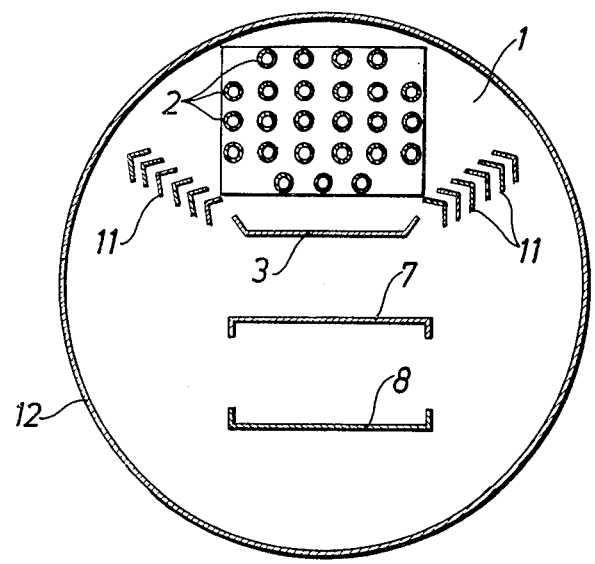

The steam thus separated from the water by the centrifugal force, the steam being indicated by unbroken, unfilled arrows, flows through a drop separator 11 (FIG. 2) to a preheater. The steam condenses on the tubes 2 and the condensate thus formed, which is indicated by broken, filled-in arrows, runs down to the condensation trough 3 from which it is removed to be taken care of.

The apparatus according to the invention is particularly suitable at low pressures since, due to its high speed, the steam is liable to take with it drops of salt water.

It should, however, be obvious that there may be more than two guide vanes and they may be arranged in planes other than that shown. They may also have a curvature designed to subject the water film to a substantially constant field of centrifugal force, for instance. It is also implicit that the evaporation apparatus according to the invention can also be used for media other than salt water.

Figure 3:
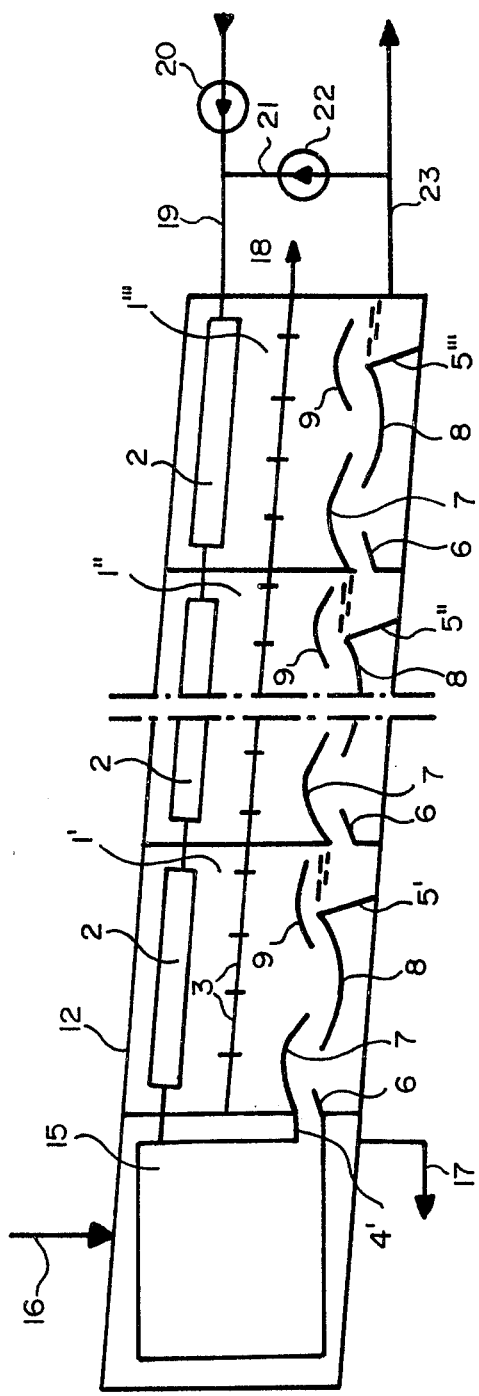
FIG. 3 shows a plant including several apparatuses according to the invention.

FIG. 3 shows a plant including several apparatuses according to the invention, being built into the housing 12. Salt water is fed to the plant via a conduct 19 and a pump 20 to the loops 2 and to a heater 15, which is heated by, for example, steam from a turbine. The steam is fed in via a conduct 16. Condensed steam is led out via a conduct 17. The salt water heated in the heater 15 is then supplied via a pipe 4' to the spout 6 and vanes 7,8 of the first steam chamber 1' and into the collecting vessel 5' and on through the following chambers 1'' and 1''' and their vessels 5'' and 5''', respectively. The concentrated salt water in the vessel 5''' is led out via a conduct 23. In order to save some of the heat content of the outgoing salt water, a shunt pipe 21 is arranged between the conducts 23 and 19. A pump 22 is arranged in the pipe 21 in order to permit control of the recirculation of salt water.

What is claimed is:

1. Evaporation apparatus particularly suitable for evaporating salt water under low pressure in a desalination plant, said apparatus comprising, in combination, liquid emitter means, means for collecting liquid, guide vane means interposed between said liquid emitter and liquid collector means defining therebetween an undulating liquid film flow path, a housing enclosing the guide vanes and forming a flash chamber said guide vane means consisting essentially of a plurality of individual guide vanes each having a curved configuration defining a concave inner surface having a pair of ends, said guide vanes being serially arranged end-to-end along said flow path with said concave inner surface of each being positioned in facing relationship on an opposite side of said liquid flow path relative to the concave inner surface of each next adjacent guide vane, said concave inner surfaces having portions proximate said ends extending in overlapping facing relationship with coextending end portions of the concave inner surface of each next adjacent guide vane, said undulating flow path being defined by said concave inner surfaces of said guide vanes which extend discontinuously on opposite sides of said liquid flow path, whereby said film of liquid flowing therealong from said liquid emitter means to said liquid collecting means may be subjected to essentially oppositely directed centrifugal forces against contacting guide vanes with exposure of said film on the unconfined side thereof opposite each of said concave inner surfaces operating to produce vapor which becomes separated from said flowing liquid film, said vanes occupying less than the transverse width of the flash chamber to allow vapors to escape from the undersides of the concave-down exposed liquid surfaces.

2. Apparatus according to claim 1 wherein said overlapping end portions of said concave inner surfaces are arranged to form at least a portion of a generally straight segment of said undulating flow path.

3. Apparatus according to claim 1 wherein said guide vanes are developable cylindrical surfaces whose elements are straight parallel lines and whose right sections are arcuate.

4. Apparatus according to claim 1 wherein said plurality of guide vanes include a first guide vane arranged adjacent said liquid emitter means to receive liquid therefrom and a last guide vane located adjacent said liquid collecting means from which liquid flows into said liquid collecting means, said liquid emitter means including a spout for directing liquid toward said first guide vane and said liquid collecting means including a guide for directing liquid from said last guide vane into said liquid collecting means.

5. Apparatus according to claim 4 wherein said liquid emitter means and said spout are configured such that the major portion of steam separated at said first guide vane is produced in said spout.

6. Apparatus according to claim 4 wherein the concave inner surface of said first guide vane is arranged to face in a downward direction and wherein said spout is directed obliquely upwardly toward the concave inner surface of said first guide vane.

7. Apparatus according to claim 4 wherein the concave inner surface of said last guide vane is arranged to face upwardly and wherein said guide comprises a curved configuration having a downwardly facing concave surface facing toward said liquid collecting means.

8. Apparatus according to claim 4 wherein said liquid emitter means and said liquid collecting means essentially consist of, respectively, a first and a second vessel for containing liquid therein and wherein said guide vanes, said spout, said guide and said first and second vessels are contained within said housing having enclosed therein a condensor and condensation removal members to remove condensation formed by steam impinging said condensor.

9. Apparatus according to claim 8 wherein said apparatus is formed as part of an evaporation plant having a plurality of similar stages connected in series, each of said stages comprising said guide vane means, said first and second vessels, said spout and said guide, with said stages being connected in series with each of said second vessels forming, simultaneously, liquid collecting means for a preceding stage and liquid emitter means for a next adjacent subsequent stage.

* * * * *